United States Patent
McKibben

(10) Patent No.: US 6,209,775 B1
(45) Date of Patent: Apr. 3, 2001

(54) BRACKET MOUNTING ARRANGEMENT FOR MACHINE FRAMES

(75) Inventor: Kenneth D. McKibben, Defiance, OH (US)

(73) Assignee: Hayes Lemmerz International, Inc., Northville, MI (US)

( * ) Notice: Subject to any disclaimer, the term of this patent is extended or adjusted under 35 U.S.C. 154(b) by 0 days.

(21) Appl. No.: 09/153,833

(22) Filed: Sep. 15, 1998

Related U.S. Application Data

(62) Division of application No. 08/761,791, filed on Dec. 6, 1996, now Pat. No. 5,833,384.

(51) Int. Cl.$^7$ .................................................. B23K 31/02
(52) U.S. Cl. .......................................... 228/138; 228/189
(58) Field of Search ..................... 228/138, 182, 228/189, 178

(56) References Cited

U.S. PATENT DOCUMENTS

| | | | |
|---|---|---|---|
| 1,290,091 | * | 1/1919 | Cole ........................................ 52/459 |
| 1,634,675 | * | 7/1927 | Mattice ................................ 219/127 |
| 1,700,319 | * | 1/1929 | Kjekstad ........................... 285/288.2 |
| 2,146,333 | | 2/1939 | Deming . |
| 2,641,829 | | 6/1953 | Sasso . |
| 2,904,142 | | 9/1959 | Colby, Jr. . |
| 3,309,120 | | 3/1967 | Wada . |
| 3,325,199 | | 6/1967 | Cole . |
| 4,069,638 | | 1/1978 | Hasselqvist et al. . |
| 4,105,151 | * | 8/1978 | Eltzroth ................................. 228/170 |
| 4,588,652 | | 5/1986 | Reynard . |

FOREIGN PATENT DOCUMENTS

| | | |
|---|---|---|
| 292624 | 6/1916 | (DE) . |
| 13720 | of 1905 | (GB) . |
| 487370 | 6/1938 | (GB) . |
| 2088012 | 6/1982 | (GB) . |

* cited by examiner

Primary Examiner—Samuel M. Heinrich
(74) Attorney, Agent, or Firm—Varnum, Riddering, Schmidt & Howlett LLP

(57) ABSTRACT

A bracket for a machine frame, such as a core molding machine frame, having horizontal and vertical members includes first and second legs adapted for attachment to the machine frame members. The first and second legs are formed from a plate material and extend perpendicular to each other. The bracket is welded around its periphery to the machine frame. A free end of at least one of the first and second legs has a tapered portion, and one or more openings may be provided in the bracket. An outer periphery of the tapered portion and an inner periphery of the openings are welded to the machine frame for further extending the total weld length and reducing stress concentration in the weld joints.

2 Claims, 3 Drawing Sheets

BRACKET MOUNTING ARRANGEMENT FOR MACHINE FRAMES

CROSS REFERENCES TO RELATED APPLICATIONS

This application is a divisional of application Ser. No. 08/761,791 filed Dec. 6,1996, now U.S. Pat. No. 5,833,384.

BACKGROUND OF THE INVENTION

1. Field of the Invention

This invention relates to a bracket mounting arrangement for machine frames and, in particular, to a bracket mounting arrangement for interconnecting the horizontal and vertical frame members of core molding machine frames.

2. Description of the Related Art

Core molding machine frames typically include lower and upper horizontal support frame assemblies connected together by a plurality of vertical posts. Lower and upper platens are supported on the lower and upper support frames, respectively, and are adapted for vertical movement toward and away from each other through hydraulics or other conventional means. Lower and upper core molds are attached to the lower and upper platens, respectively, and are positioned on the platens so that the molds are in mutual alignment for a molding operation. The vertical posts are typically secured to the lower and upper frames through mounting bolts that are either parallel or perpendicular to the vertical posts. As the core molds are pressed toward each other and come into mutual contact during the molding process, opposing forces from the hydraulics put the core molds in compression. Equal but opposite tensile forces are transmitted to the vertical posts, and consequently, the mounting bolts are subjected to shear or tensile forces. The shear or tensile forces tend to deform the bolts along their longitudinal axis, and depending on the orientation at which the bolts are mounted, they can either bend or their threads can become worn or stripped. The bolts may also suffer from work hardening due to repeat cycling of the core molding operation. In any event, movement between the cross members and vertical posts eventually occurs and consequently affects the quality of the molded components. Eventual failure of the connection between the vertical posts and cross members can lead to disastrous results, high repair costs, and machine down time.

SUMMARY OF THE INVENTION

These and other problems of the prior art are overcome by the provision of a bracket mounting arrangement for interconnecting the horizontal and vertical members of a machine frame. According to one aspect of the invention, a bracket for a machine frame comprises a first leg adapted for attachment to the machine frame vertical member and a second leg integrally formed with and extending from one end of the first leg and being adapted for attachment to the machine frame horizontal member. A free end of at least one of the first and second legs has a tapered portion for further attachment of the bracket to the machine frame to transfer only tensile forces acting on the vertical member to the bracket. The bracket is preferably formed of a plate material and the first and second legs are of unitary construction. The bracket is preferably attached about its periphery to the machine frame.

According to a further aspect of the invention, at least one opening extends through the bracket for further attachment of the bracket to the machine frame.

According to an even further aspect of the invention, the bracket includes a pair of first legs integral with and extending from the second leg. A free end of each first leg is provided with a tapered portion for further attaching the bracket to the machine frame.

According to another aspect of the invention, a method of constructing a machine frame having at least one horizontal member for connection to at least one vertical member subject to tensile forces includes providing a bracket having a first leg and a second leg integrally formed with and extending from one end of the first leg. At least one of the first and second legs has a free end with a tapered portion attached to the machine frame. The vertical member is attached to the at least one horizontal member by welding the bracket around its periphery to the vertical member and horizontal member, such that only tensile forces acting on the vertical member are transferred to the bracket.

BRIEF DESCRIPTION OF THE DRAWINGS

The invention will now be described with reference to the drawings in which.

DETAILED DESCRIPTION OF THE PREFERRED EMBODIMENTS

Figure 1:
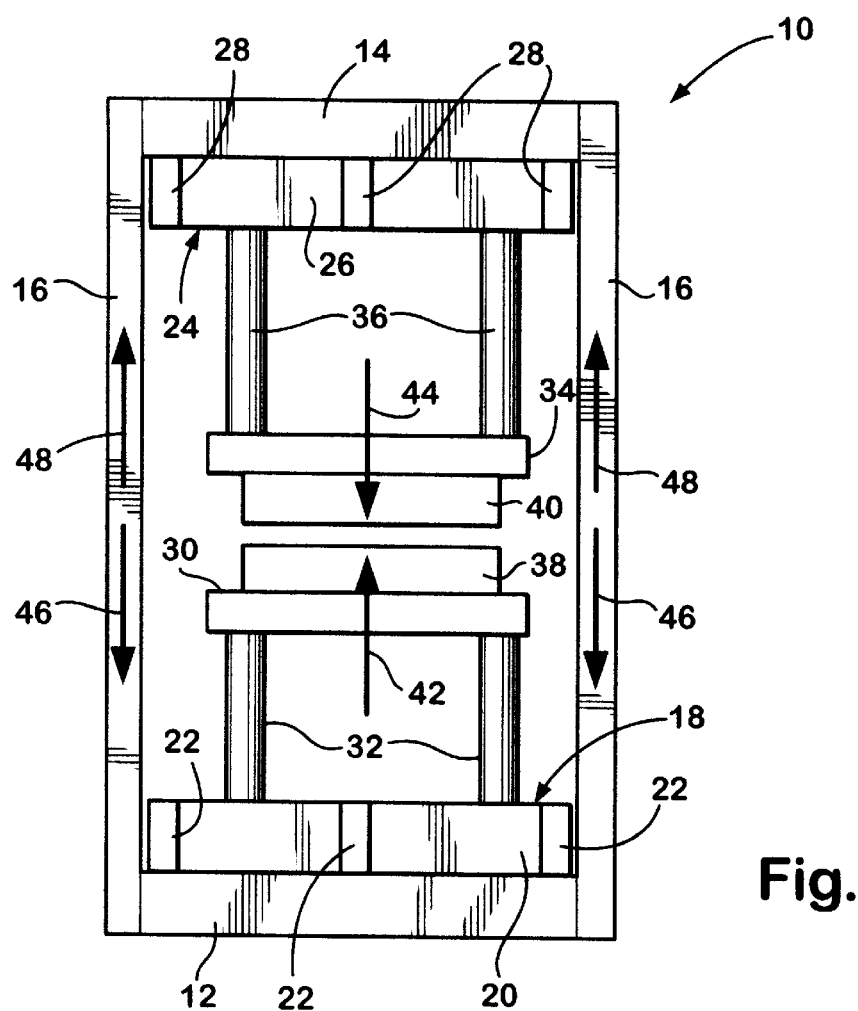
FIG. 1 is a side-elevational, diagrammatic view of a core molding machine frame and the forces generated therein.

Referring now to FIG. 1, a side view of a core molding machine frame 10 reveals a side frame assembly having a lower cross member 12 attached to an upper cross member 14 through a plurality of vertically extending posts 16. A similar arrangement (not shown) is provided at the opposite side of the machine frame 10. A lower support frame 18 includes a lower cross beam 20 and a plurality of base support beams 22 that extend perpendicularly therefrom to the opposite side of the machine frame 10. The beams 22 are supported on the lower cross member 12 on opposite sides of the machine frame 10. In a similar arrangement, an upper support frame 24 includes an upper cross beam 26 and a plurality of upper support beams 28 that extend perpendicularly therefrom to the opposite side of the machine frame 10. The beams 28 are attached to the upper cross member 14 on opposite sides of the machine frame 10 in a conventional manner. A lower platen 30 is mounted for vertical movement through a plurality of hydraulic pistons, represented schematically at 32, extending between the lower support frame 18 and the lower platen 30. Similarly, an upper platen 34 is mounted for vertical movement through a plurality of hydraulic pistons, represented schematically at 36, extending between the upper support frame 24 and the upper platen 34. The lower and upper core molds 38, 40 are attached to the lower and upper platens 30, 34, respectively. The core molds 38, 40 are positioned on the platens so that the molds are in mutual alignment for the molding operation.

Figures 2, 3:
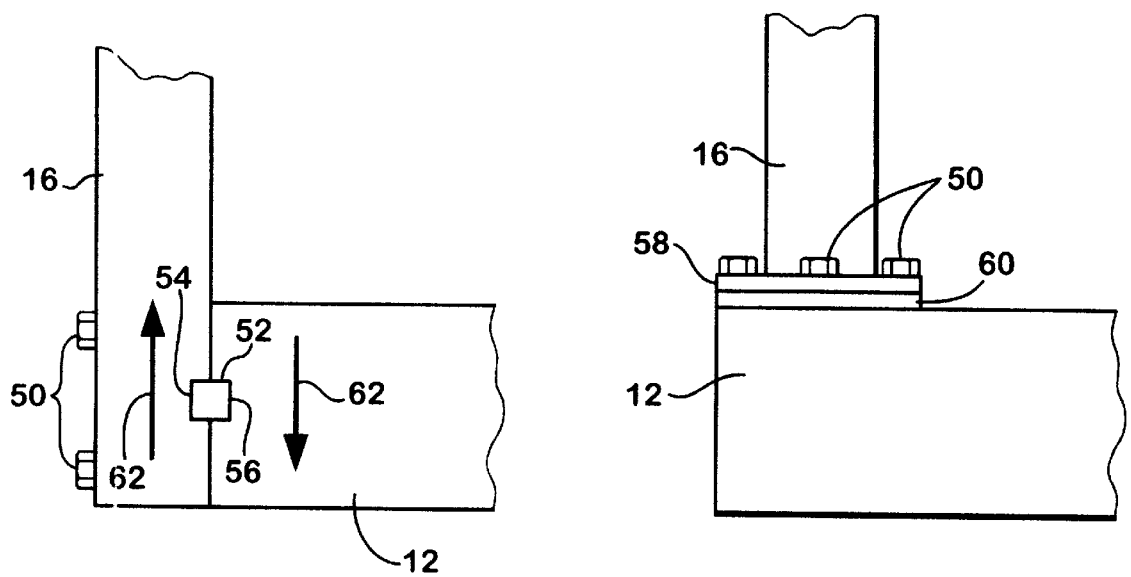
FIG. 2 is a partial, side-elevational view of a prior art interconnection assembly between frame components of a core molding machine.
FIG. 3 is a view similar to FIG. 2 showing another prior art interconnection assembly between frame components of a core molding machine.

With reference to FIG. 2, a prior art arrangement for connecting the vertical posts 16 with the lower cross member 12 reveals a plurality of bolts 50 that extend horizontally through the vertical post 16 and into the lower cross member 12. The bolts are secured with nuts or threaded apertures (not shown) in the lower cross member 12. A rod or bar 52 that is square-shaped in cross section is received within a channel 54 of the vertical post 16 and a corresponding channel 56 in the cross member 12. Although the above description relates to the lower cross member 12, it is to be understood that a similar arrangement is provided for connection of the vertical posts 16 to the upper cross member 14.

As shown in FIG. 3, another prior art arrangement for connecting the vertical posts 16 with the lower cross member 12 reveals a plurality of bolts 50 that extend vertically through a mounting flange 58 at a lower portion of the vertical post 16 and a mounting plate 60 and into the lower cross member 12. The bolts are secured with nuts or threaded apertures (not shown) in the lower cross member 12.

Referring again to FIG. 1, as the core molds 38, 40 are pressed toward each other and come into mutual contact during the molding process, opposing forces, as represented by arrows 42, 44, are applied to the core molds through actuation of the pistons 32, 36, putting the core molds in compression. Equal but opposite tensile forces are transmitted to the vertical posts 16, as represented by arrows 46, 48. Resulting shear forces, as represented by arrows 62, are transmitted to the bolts 50 and bar 52 in FIG. 2. As the machine cycles through successive molding operations, the resulting shear forces tend to deform the bolts 50 and round the corners of the bar 52 to permit movement between the vertical posts 16 and the cross members 12.

In FIG. 3, although the tensile forces in the vertical posts 16 are directly transmitted to the bolts 50, shear forces are present between the threads of the bolts and the corresponding threads associated with the cross members 12, 14. The threads may become worn or stripped, and the bolts may suffer from work hardening due to repeat cycling of the core molding operation. In any event, movement between the cross members and vertical posts eventually occurs and consequently affects the safety of the machine and, perhaps, the quality of the molded components. Eventual failure of the connection between the vertical posts and cross members can lead to disastrous results, high repair costs, and machine down time.

Figure 4:
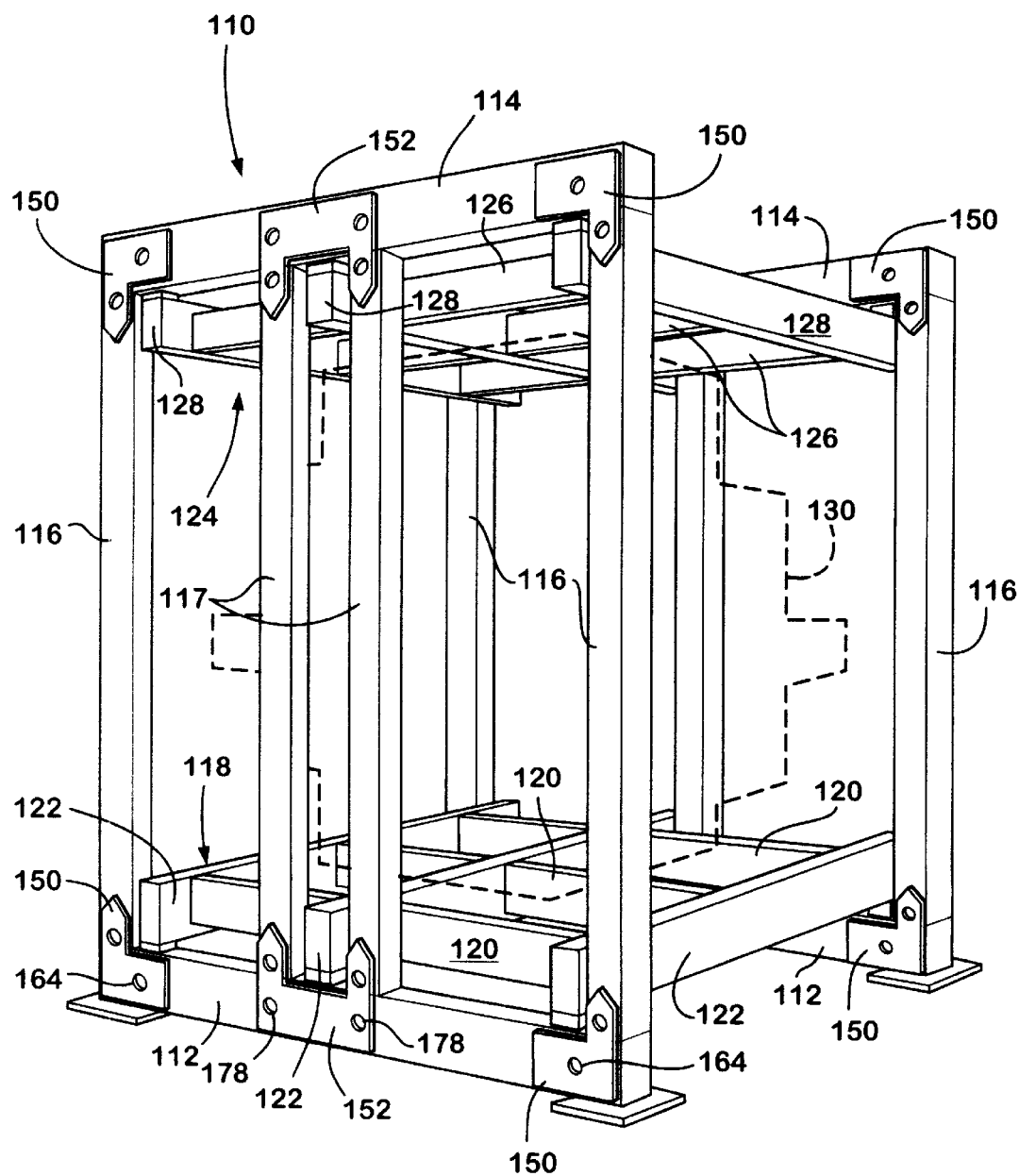
FIG. 4 is a perspective view of a core molding machine frame and bracket assembly according to the invention.

Referring now to FIG. 4, a machine frame 110 that may form part of a core molding machine is illustrated. The machine frame 110 includes a pair of lower cross members 112 attached to a corresponding pair of upper cross members 114 through a plurality of vertically extending corner posts 116 and side posts 117. A lower support frame 118 includes a plurality of lower cross beams 120 and a plurality of base support beams 122 that extend perpendicular to the cross beams 120. The beams 122 are supported on the lower cross member 112 on opposite sides of the machine frame 110. In a similar arrangement, an upper support frame 124 includes a plurality of upper cross beams 126 and a plurality of upper support beams 128 that extend perpendicular to the upper cross beams 126. The support beams 128 are attached to the upper cross members 114 on opposite sides of the machine frame 110 in a conventional manner. A core molding mechanism 130 (shown in dashed line) may be associated with the machine frame, similar to the FIG. 1 arrangement.

Figure 5:
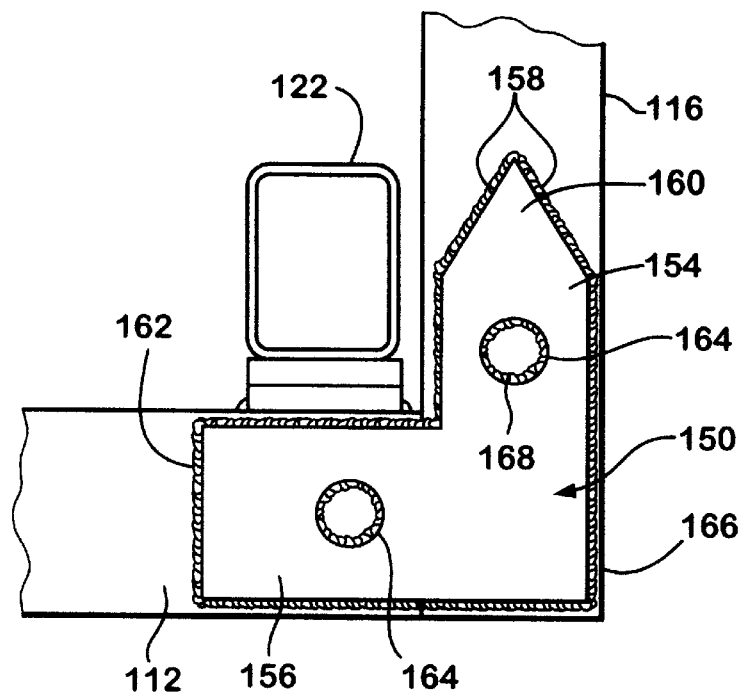
FIG. 5 is an enlarged, side-elevational view of a corner bracket assembly for attaching horizontal and vertical members at a corner of the machine frame together.

With reference now to FIGS. 4 and 5, the machine frame 110 includes a plurality of corner brackets 150 for securing the corner posts 116 to the lower and upper cross members 112, 114. The corner brackets are preferably stamped from plate material of ¼-inch thickness. It is to be understood, however, that other techniques and thicknesses can be used for forming the corner brackets depending on the particular machine frame and loads transmitted therethrough.

Each corner bracket 150 includes a first vertical leg 154 adapted for attachment to a vertical post 116 and a second horizontal leg 156 adapted for attachment to a lower cross member 112. The first and second legs 154, 156 preferably extend substantially perpendicular to each other, but may extend at other angles to each other depending on the type of machine frame to which the bracket is installed. The free end of the first leg 154 includes a pair of edges 158 that converge toward each other to form a tapered end portion 160 while the free end of the second leg 156 includes an edge 162 that extends substantially parallel to the first leg 154. Alternatively, the edge 162 may be tapered in a similar manner as edges 158. An opening 164 is located in the bracket 150 and extends through the thickness of the bracket plate. A single opening may be provided, as shown in FIG. 4, or a plurality of openings may be provided, as shown in FIG. 5. Alternatively, the openings may be eliminated depending on the particular machine frame requirements.

The corner bracket 150 is installed by positioning the first leg 154 on a vertical post 116 so that the tapered portion 160 points upward and positioning the second leg 156 on a lower cross member 112. The outer periphery of the bracket 150 is then welded to form a weld joint 166. The inner periphery of the openings 164 are then welded to form a second weld joint 168. Preferably, the weld joints 166, 168 are formed by stitch welding. However, the weld joints may alternatively be formed by continuous welding. The installation of the bracket 150 in this manner substantially eliminates the shear stresses associated with the prior art. Any tensile force acting on the vertical post 116 is directly transmitted to the bracket 150, which places the entire bracket in tension. The tapered portion 160 increases the length of the weld joint 166 to distribute any stress that may be present over a greater total weld length while reducing or eliminating point stresses in the weld joint 166. The weld joints 168 in the openings 164 serve to further increase the total weld length. The total amount of stress that the weld joint can resist is increased as the length of the weld joint is increased. The corner bracket tapered portion and openings additionally discourage stress concentration in the weld joints.

Figure 6:
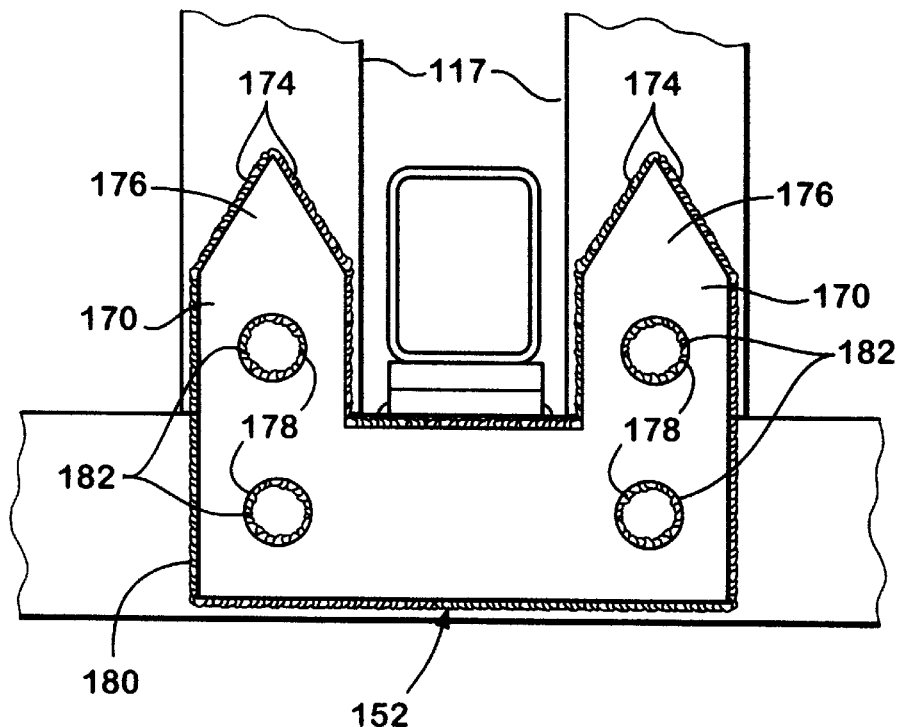
FIG. 6 is an enlarged, side-elevational view of a side bracket for attaching horizontal and vertical members at a side of the machine frame together.

With reference now to FIGS. 4 and 6, the machine frame 110 additionally includes a plurality of side brackets 152 for securing the side posts 117 to the lower and upper cross members 112, 114 when the side posts are present. As with the corner brackets, the side brackets are preferably stamped from plate material of ¼-inch thickness. It is to be understood, however, that other techniques and thicknesses can be used for forming the side brackets, depending on the particular machine frame configuration and loads transmitted therethrough.

Each side bracket 152 includes a pair of first vertical legs 170 adapted for attachment to a vertical side post 117 and a second horizontal leg 172 adapted for attachment to a lower cross member 112. The second leg 172 preferably extends substantially perpendicular to the first pair of legs 170, but may extend at other angles depending on the type of machine frame to which the side bracket is installed. As in the corner bracket 150, the free end of each leg 170 includes a pair of edges 174 that converge toward each other to form a tapered end portion 176. A plurality of openings 178 are located in each leg 170 of the bracket 152 and extend through the thickness of the bracket plate. Alternatively, a single opening in each leg 170 may be provided, as shown in FIG. 4. As in the corner bracket 150, the openings may be eliminated, depending on the particular machine frame requirements.

The side bracket 152 is installed by positioning each of the first legs 170 on a vertical post 117 so that the tapered portion 176 points upward and positioning the second leg 172 on a lower cross member 112. The outer periphery of the bracket 152 is then welded to form a weld joint 180. The inner periphery of the openings 178 are then welded to form a second weld joint 182. Preferably, the weld joints 180, 182 are formed by stitch welding. However, the weld joints may alternatively be formed by continuous welding. As with the corner bracket 150, the installation of the bracket 152 in this manner substantially eliminates the shear stresses associated with the prior art. Any tensile forces acting on the vertical posts 117 are directly transmitted to the side bracket 152, which places the entire side bracket in tension.

Reasonable variation and modification are possible within the spirit of the foregoing specification and drawings without departing from the scope of the invention.

The embodiments for which an exclusive property or privilege is claimed are defined as follows:

1. In a method of constructing a machine frame having at least one horizontal member for connection to at least one vertical member subject to tensile forces, comprising the steps of:

providing a bracket having a first leg and at least one second leg integrally formed with and extending from one end of the first leg, at least one of the first and second legs having a free end with a tapered portion provided thereon, the tapered portion being attached to the machine frame and having an end point at the top of the tapered portion;

attaching the at least one vertical member to the at least one horizontal member by:

welding the bracket around the periphery of the first leg to the horizontal member;

welding the bracket around the periphery of the at least one second leg to the vertical member; and welding the bracket around the periphery of the tapered portion to one of the members, in a manner so that the weld joint is feathered at the top of the tapered portion, thereby increasing the length of the weld joint and reducing point stresses;

whereby only tensile forces acting on the at least one vertical member are transferred to the bracket.

2. A method of constructing a machine frame according to claim 1 wherein the bracket includes at least one opening having an inner periphery extending therethrough, and wherein the step of attaching includes welding the inner periphery of the at least one opening to the machine frame.

* * * * *